United States Patent
Yagi et al.

(10) Patent No.: US 8,302,754 B2
(45) Date of Patent: Nov. 6, 2012

(54) TAPERED COUPLING STRUCTURE AND ROTATING MACHINE

(75) Inventors: Katsuki Yagi, Hiroshima (JP); Hiroki Terado, Hiroshima (JP); Eiichi Yanagisawa, Hiroshima (JP); Hitoshi Shinohara, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 680 days.

(21) Appl. No.: 12/507,883

(22) Filed: Jul. 23, 2009

(65) Prior Publication Data

US 2010/0200354 A1    Aug. 12, 2010

(30) Foreign Application Priority Data

Feb. 12, 2009  (JP) ................................. 2009-030180

(51) Int. Cl.
*F16D 11/04*  (2006.01)
*F16D 1/092*  (2006.01)
*B23P 11/02*  (2006.01)

(52) U.S. Cl. ..................... 192/66.2; 192/85.21; 192/101; 403/15

(58) Field of Classification Search ................. 192/66.2, 192/101, 65; 403/31, 36, 15
See application file for complete search history.

(56) References Cited

U.S. PATENT DOCUMENTS

| | | | |
|---|---|---|---|
| 2,840,399 A * | 6/1958 | Harless et al. ................... | 403/15 |
| 3,228,102 A * | 1/1966 | Sillett .............................. | 29/252 |
| 3,865,497 A * | 2/1975 | Bratt et al. ....................... | 403/15 |
| 3,937,103 A * | 2/1976 | Kleinhans ....................... | 403/15 |
| 4,375,926 A * | 3/1983 | Feller .............................. | 403/31 |
| 7,837,406 B2 * | 11/2010 | Landwehr ....................... | 403/31 |

FOREIGN PATENT DOCUMENTS

| DE | 196 35 542 | 3/1998 |
|---|---|---|
| FR | 2217848 | 9/1974 |
| GB | 969895 | 9/1964 |
| JP | 49-96161 | 9/1974 |
| JP | 53-10067 | 1/1978 |
| JP | 54-28959 | 3/1979 |
| JP | 55-40283 | 3/1980 |

(Continued)

OTHER PUBLICATIONS

Japanese Office Action issued Nov. 17, 2010 in corresponding Japanese Patent Application No. 2009-030180 with English Translation.

(Continued)

*Primary Examiner* — David D Le
*Assistant Examiner* — Jacob S Scott
(74) *Attorney, Agent, or Firm* — Wenderoth, Lind & Ponack, L.L.P.

(57) ABSTRACT

A tapered coupling structure allows a tapered shaft to be coupled to and decoupled from a hub without the use of an 0-ring. The tapered shaft is provided with a taper part on the side that is coupled to the hub, and the hub is provided with a high-rigidity part having a thickness in the radial direction larger than that of other regions and having a high rigidity in the radial direction. An oil groove formed in the outer peripheral surface of the taper part to feed oil to the coupling surfaces of the taper part and the hub is provided in a region corresponding to the high-rigidity part in the axial direction.

4 Claims, 7 Drawing Sheets

FOREIGN PATENT DOCUMENTS

| | | |
|---|---|---|
| JP | 58-160027 | 9/1983 |
| JP | 58-153720 | 10/1983 |
| JP | 61-203227 | 9/1986 |
| JP | 5-296252 | 11/1993 |
| JP | 3054261 | 9/1998 |
| JP | 2001-247093 | 9/2001 |
| JP | 2008-25596 | 2/2008 |

OTHER PUBLICATIONS

Japanese Office Action issued Feb. 9, 2011 in corresponding Japanese Patent Application No. 2009-030180 w/English translation.

European Search Report issued Feb. 9, 2011 in corresponding European Patent Application No. 09165402.0.

* cited by examiner

US 8,302,754 B2

TAPERED COUPLING STRUCTURE AND ROTATING MACHINE

BACKGROUND OF THE INVENTION

1. Field of the Invention

The present invention relates to a tapered coupling structure in which a shaft provided with a taper-shaped outer periphery and a hub provided with a taper-shaped inner periphery are coupled to each other.

2. Description of the Related Art

As a machine element for transmitting the output of a driver to driven equipment, a coupling has been known. Among various types of couplings, there has been known a coupling in which an output shaft of driver provided with a taper-shaped outer periphery in the shaft end portion thereof (hereinafter, referred to as a tapered shaft) and a hub into which the shaft end portion is inserted and which has a hollow part provided with a taper-shaped inner periphery are coupled to each other. This coupling structure is used to transmit high output, for example, to transmit the output of a steam turbine to a compressor, or to transmit engine power to a propeller shaft. In some cases, the hub is provided on the driver side, and the tapered shaft is provided on the driven equipment side.

In the tapered coupling structure (hereinafter, sometimes referred to simply as a coupling structure), when the tapered shaft is coupled to the hub, or when the tapered shaft is decoupled from the hub, oil is fed to the coupling surfaces of the tapered shaft and the hub to increase the diameter of the hub, by which coupling and decoupling are enabled. For this purpose, the coupling structure is configured so that an oil passage is provided in the tapered shaft (or the hub), and an oil groove connecting with the oil passage is provided in the outer peripheral surface of the tapered shaft (or the inner peripheral surface of the hub) to feed oil to the coupling surfaces via the oil passage and oil groove.

Coupling and decoupling of the coupling structure can also be performed by heating and thermally expanding the hub besides the use of hydraulic pressure. However, the work for heating the hub is not easy to perform in the case where the hub is large. Also, the heating of hub may produce thermal deformation of the hub. In this case, it is difficult to reuse the hub as it is as a rotating body.

Therefore, in the coupling structure, coupling and decoupling are performed with hydraulic pressure in most cases.

As described in Japanese Registered Utility Model No. 3054261, the coupling structure in which coupling and decoupling are performed by hydraulic pressure has a problem in that oil scatters from the oil groove, and contaminates the surroundings. Japanese Registered Utility Model No. 3054261 proposes that a fine groove (the depth is 5/100 mm or less) is formed in the inner peripheral surface of the hub. According to Japanese Registered Utility Model No. 3054261, due to the formation of the fine groove, since oil as a complete fluid does not exist on the inner peripheral surface of the hub, even if the tapered shaft is removed and the oil is thereby exposed to the air, the oil does not scatter fluidly and maintains a state of adhering still to the surface layer portion.

The problem of oil scattering can be solved by the proposal of Japanese Registered Utility Model No. 3054261 and further by the kind of oil used. However, with regard to the coupling structure, a problem described below has been brought forward.

To facilitate coupling and decoupling using hydraulic pressure, conventionally, a technique in which an O-ring is interposed between the tapered shaft and the hub has often been adopted. In this technique, a pair of O-rings is disposed at a predetermined interval in the axial direction, and an oil groove is provided between the paired O-rings. By doing this, the oil fed via the oil passage and oil groove is accumulated in a closed space formed by the tapered shaft, the hub, and the paired O-rings, so that a hydraulic pressure for increasing the diameter of hub can be obtained easily.

However, a demand for avoidance of the use of O-rings has arisen. The reason for this is that it is supposed that if the O-ring is broken during the use of the coupling structure, decoupling of the tapered shaft from the hub may become difficult to do.

In the coupling structure without the use of O-rings, the fed oil is liable to leak from the end part of the structure, so that a hydraulic pressure necessary for coupling or decoupling is difficult to obtain. If coupling or decoupling is performed forcedly in this state, scratches occur on the outer peripheral surface of the tapered shaft and the inner peripheral surface of the hub.

SUMMARY OF THE INVENTION

The present invention has been accomplished to solve the above-described technical problems, and accordingly an object thereof is to provide a tapered coupling structure in which a tapered shaft can be coupled to and decoupled from a hub without the use of an O-ring.

Conditions for decoupling a tapered shaft 110 from a hub 120 in a coupling structure 100 are explained with reference to FIGS. 1A and 1B.

In the coupling structure 100, in the state in which the tapered shaft 110 is coupled to the hub 120, the tapered shaft 100 is subjected to a pressure (surface pressure) P by the hub 120 as shown in FIG. 1A.

When oil is fed to between the tapered shaft 110 and the hub 120 to decouple the tapered shaft 110 from the hub 120, a force Ft directed in the direction indicated by the arrow mark in FIG. 1B acts on the tapered shaft 110. On the other hand, between the tapered shaft 110 and the hub 120, a frictional resistance μN directed in the opposite direction to Ft acts. When Ft exceeds μN, the tapered shaft 110 can be decoupled from the hub 120. The letter μ denotes the coefficient of dynamic friction, and the letter N denotes the load based on the surface pressure P.

Conventionally, to feed oil to between the tapered shaft 110 and the hub 120, an oil groove 112 provided in the outer peripheral surface of the tapered shaft 110 (or the inner peripheral surface of the hub 120) has been arranged in the center (or in the vicinity of the center) in the axial direction of a taper part 111 of the tapered shaft 110. This is because the oil permeates in a wide range in the axial direction of the taper part 111. By the pressure of the fed oil O, as shown in FIGS. 2A and 2B, the inner peripheral surface of the hub 120 is curved into a concave shape. When the inside diameter of the hub 120 is increased in this manner, the contact area between the taper part 111 and the hub 120 decreases, and accordingly the frictional resistance μN decreases. That is to say, when the contact area between the taper part 111 and the hub 120 is small as shown in FIG. 2A, decoupling is easy to perform, and when the contact area between the taper part 111 and the hub 120 is large as shown in FIG. 2B, decoupling is difficult to perform.

As shown in FIG. 1A, the surface pressure P increases in a portion in which the thickness in the radial direction of the hub 120 is large, that is, as the rigidity in the radial direction increases. Therefore, in order to remove the tapered shaft 110, the hydraulic pressure acting in this portion must be increased. However, if the oil groove 112 is arranged in the center (or in the vicinity of the center) in the axial direction of the taper part 111 of the tapered shaft 110, the distance to this portion is long, so that the hydraulic pressure acting on this portion is low.

As described above, in the conventional coupling structure 100, the position at which the oil groove 112 is provided has been unsuitable to the shape of the hub 120.

Accordingly, the present invention provides a tapered coupling structure in which a tapered shaft and a hub are coupled to each other, the tapered shaft being provided with a taper part on the side of being coupled to the hub; and the hub being provided with a high-rigidity part having a thickness in the radial direction larger than that of other regions and having a high rigidity in the radial direction, wherein a first oil groove formed in the outer peripheral surface of the taper part or in the inner peripheral surface of the hub to feed oil to the coupling surfaces of the taper part and the hub is provided in a first region corresponding to the high-rigidity part in the axial direction.

In the present invention, the high-rigidity part is preferably arranged on the front end side of the coupling part of the taper part and the hub. In this case, the first oil groove is preferably arranged on the rear end side of the center of width in the axial direction of the high-rigidity part.

Also, in the present invention, a second oil groove can be formed in a second region different from the first region.

The tapered coupling structure in accordance with the present invention is used as a coupling structure in a rotating machine comprising a driver for delivering a rotational force; driven equipment rotationally driven by the output of the driver; and the coupling structure for transmitting the output of the driver to the driven equipment.

The tapered coupling structure in accordance with the present invention can feed oil preferentially to a region having a high surface pressure because the first oil groove for feeding the oil to the coupling surfaces of the taper part and the hub is provided in the first region corresponding to the high-rigidity part in the axial direction. As a result, there can be provided the tapered coupling structure in which the tapered shaft can be coupled to and decoupled from the hub without the use of an O-ring.

DETAILED DESCRIPTION OF THE INVENTION

First Embodiment

The present invention will now be described in detail based on a first embodiment shown in the accompanying drawing.

Figure 3A:
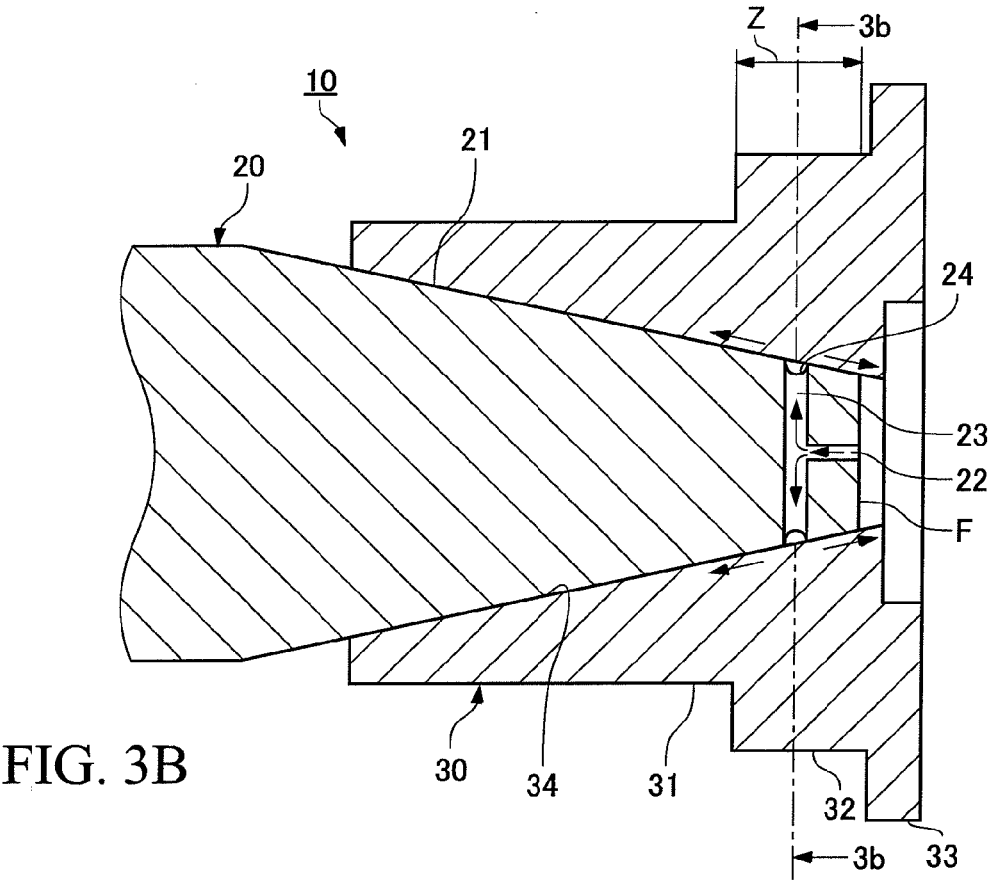
FIGS. 3A and 3B are sectional views of a tapered coupling structure in accordance with a first embodiment.
Figure 3B:
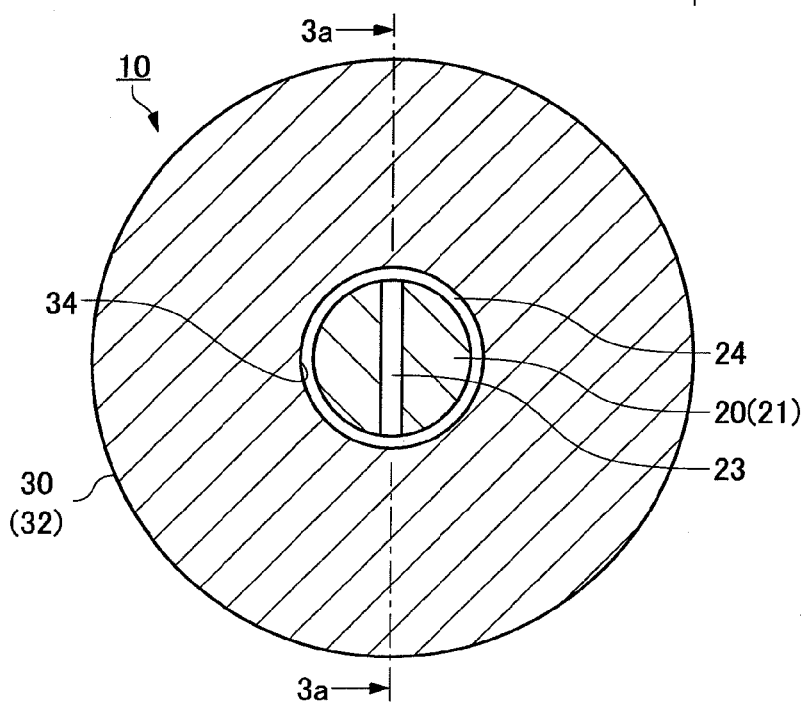

FIGS. 3A and 3B are sectional views of a coupling structure 10 in accordance with the first embodiment, FIG. 3A being a sectional view taken along the line 3a-3a of FIG. 3B, and FIG. 3B being a sectional view taken along the line 3b-3b of FIG. 3A.

The coupling structure 10 is made up of a tapered shaft 20 and a hub 30 coupled to the tapered shaft 20. The tapered shaft 20 constitutes, for example, the output shaft of a steam turbine, not shown. The hub 30 is connected to, for example, the input shaft of a compressor, not shown, and functions as an element for transmitting the output of the steam turbine to the compressor.

The tapered shaft 20 includes a taper part 21 the diameter of which decreases toward the tip end. In the present invention, the tip end side of the tapered shaft 20 is defined as the front, and the opposite side thereto as the rear.

An axial oil passage 22 is formed along the axial direction of the tapered shaft 20 from a front end surface F of the taper part 21. Also, a radial oil passage 23 is formed in the radial direction of the taper part 21. The radial oil passage 23 communicates with the axial oil passage 22, and both ends thereof are open to the outer peripheral surface of the taper part 21. Therefore, oil fed from a hydraulic pressure source, not shown, flows along the axial direction in the axial oil passage 22 that is open to the front end surface F of the taper part 21, and then flows to the outer periphery side in the radial direction along the radial oil passage 23 as indicated by arrow marks. Thereafter, the oil flows out to the coupling surfaces of the taper part 21 and the hub 30.

At a position at which the radial oil passage 23 is open on the outer peripheral surface of the taper part 21, an oil groove 24 is formed along the circumferential direction of the taper part 21. The oil flowing out of the opening of the radial oil passage 23 flows in the oil groove 24, by which the oil is permeated in the circumferential direction of the outer peripheral surface of the taper part 21. When oil is fed even after the oil groove 24 has been filled with oil, the oil is permeated toward the axial direction onto the coupling surfaces of the taper part 21 and the hub 30.

Figure 1A:
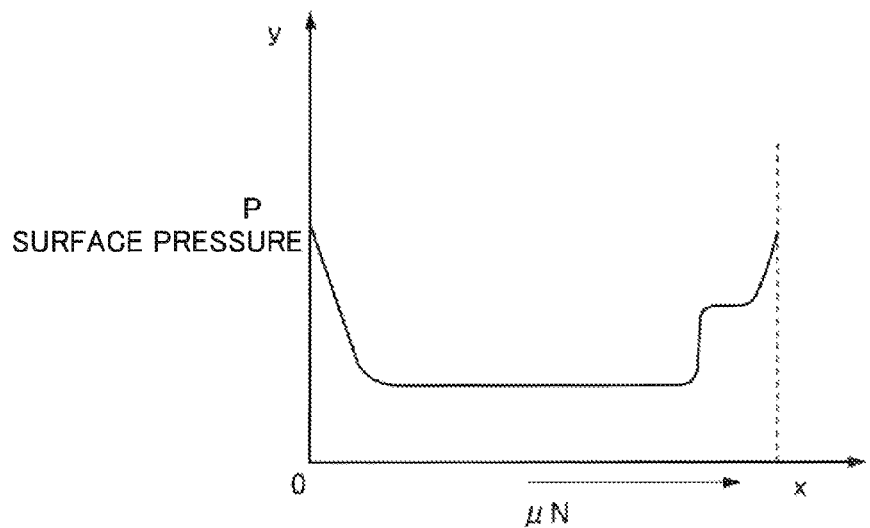
FIGS. 1A and 1B are diagrams for explaining a force acting on a tapered coupling structure.
Figure 1B:
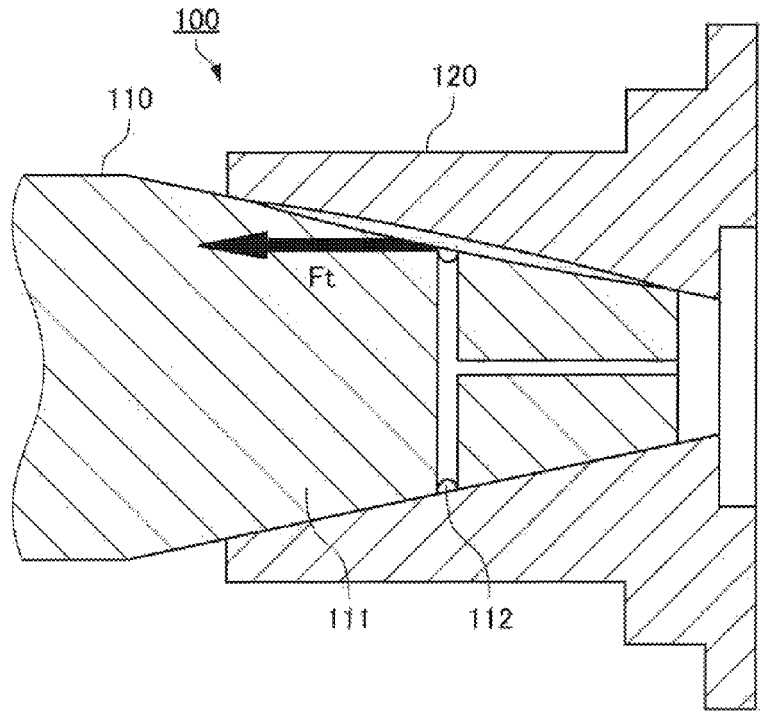
Figure 2A:
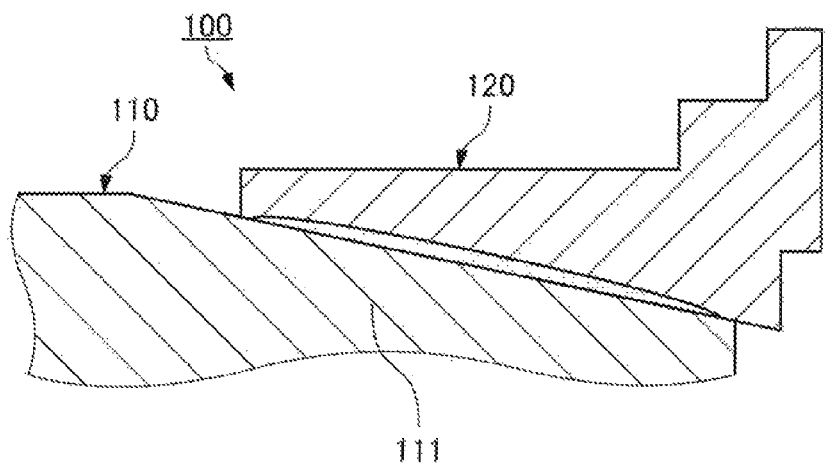
FIGS. 2A and 2B are sectional views showing a state in which oil is fed to coupling surfaces of a tapered shaft and a hub of a tapered coupling structure.
Figure 2B:
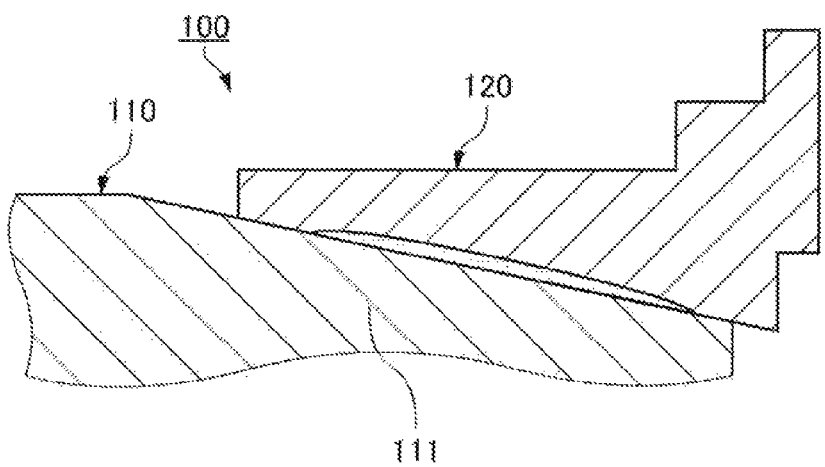

The hub 30 includes a base part 31 having a hollow part through which the taper part 21 of the tapered shaft 20 penetrates, a high-rigidity part 32 having an outside diameter larger than that of the base part 31, and a flange part 33 located on the front end side of the high-rigidity part 32. The flange part 33 is connected, with bolts or other fastening means, to a structural member that is subjected to a transmitted force. The high-rigidity part 32 is a part that is continuous with the flange part 33 and is subjected to a high torsional stress, so that the wall thickness thereof in the radial direction is set large. Therefore, the high-rigidity part 32 is arranged on the front end side. Since the high-rigidity part 32 has a wall thickness in the radial direction larger than that of the base part 31, the surface pressure P of the taper part 21 received from the high-rigidity part 32 is higher than the surface pressure P of the taper part 21 received from the base part 31 as shown in FIG. 1A.

The hollow part of the hub 30 penetrates in the axial direction, and there is formed a taper part accommodating part 34 the diameter of which decreases continuously toward the front end from the rear end thereof.

As shown in FIG. 3A, in the tapered coupling structure 10 in which the tapered shaft 20 and the hub 30 are coupled to each other at a normal position, the oil groove 24 is provided in a region (a first region) corresponding to the high-rigidity part 32 of the hub 30. More specifically, the oil groove 24 is formed in the range in the axial direction in which the tapered shaft 20 and the hub 30 are coupled to each other and in the range in which the high-rigidity part 32 is located (in the range indicated by Z in FIG. 3A).

In the tapered coupling structure 10, the oil groove 24 is provided at a position corresponding to the high-rigidity part 32 of the hub 30. As described above, the surface pressure P of the taper part 21 received from the high-rigidity part 32 is high. However, since the oil groove 24 is provided at a position corresponding to the high-rigidity part 32, the hydraulic pressure acting on the hub 30 against the surface pressure is higher than the hydraulic pressure on the surroundings. Therefore, the tapered shaft 20 can be coupled to or decoupled from the hub 30 without the provision of an O-ring.

In the case of the tapered coupling structure 10, the high-rigidity part 32 is arranged on the front end side. In this case, if the position at which the oil groove 24 is provided is too close to the front end surface F of the tapered shaft 20 even if corresponding to the high-rigidity part 32 of the hub 30 (being in the range indicated by Z in FIG. 3A), the fed oil may leak to the outside without acting. In this case, therefore, the oil groove 24 is preferably provided at a position corresponding to the high-rigidity part 32 and moreover on the rear end side of the center in the axial direction of the high-rigidity part 32. Needless to say, this consideration is unnecessary in the case where the high-rigidity part 32 is arranged at a position other than the position near the front end.

Second Embodiment

Figure 4:
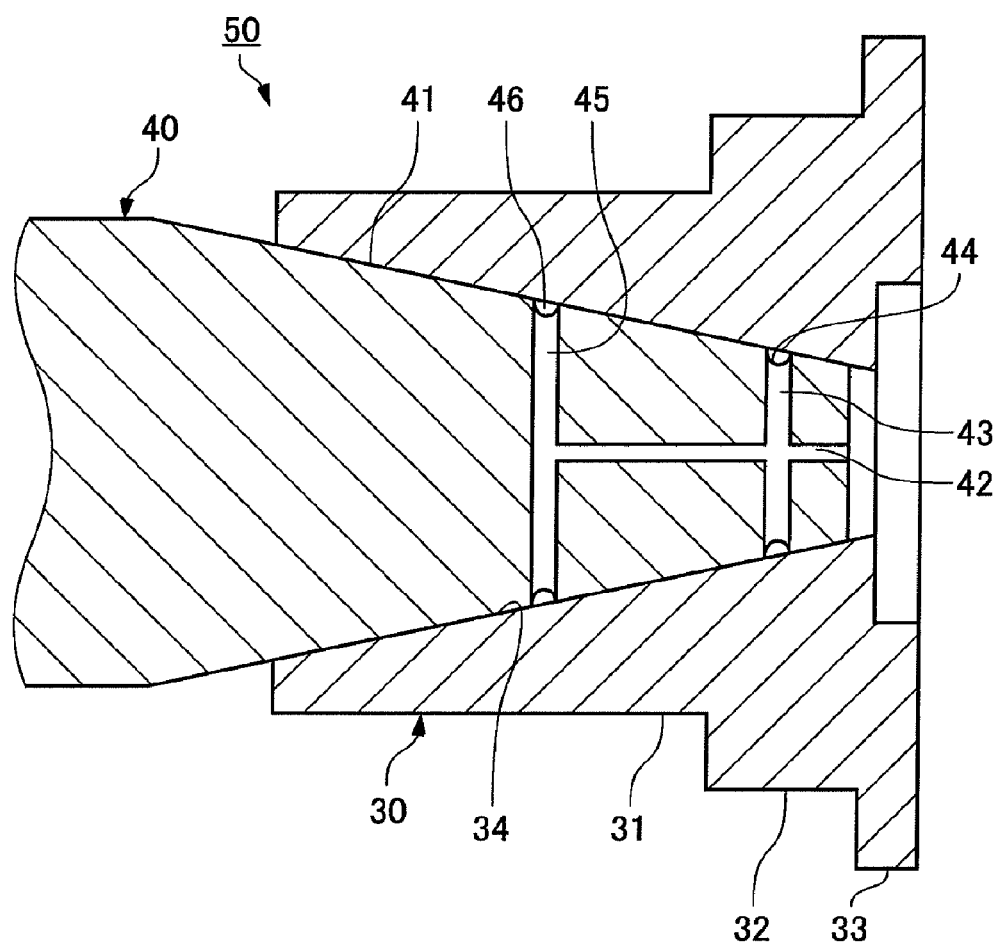
FIG. 4 is a sectional view of a tapered coupling structure in accordance with a second embodiment.

FIG. 4 is a sectional view of a coupling structure 50 in accordance with a second embodiment.

The coupling structure 50 comprises a tapered shaft 40 and the hub 30 coupled to the tapered shaft 40. The hub 30 is the same as that of the first embodiment, and therefore the explanation thereof is omitted.

The tapered shaft 40 includes a taper part 41, and an axial oil passage 42 is formed along the axial direction of the tapered shaft 40 from the front end surface of the taper part 41. Also, in the radial direction of the taper part 41, a first radial oil passage 43 and a second radial oil passage 45, which is provided at a predetermined interval from the first radial oil passage 43, are formed. The first radial oil passage 43 communicates with the axial oil passage 42, and both ends thereof are open to the outer peripheral surface of the taper part 41. The second radial oil passage 45 communicates with the terminal end of the axial oil passage 42, and both ends thereof are open to the outer peripheral surface of the taper part 41. Therefore, oil fed from a hydraulic pressure source, not shown, flows in the axial oil passage 42 and the first radial oil passage 43 in order, and flows out to the outer peripheral surface of the taper part 41. Also, the oil flows in the axial oil passage 42 and the second radial oil passage 45 in order, and flows out to the outer peripheral surface of the taper part 41.

At a position at which the first radial oil passage 43 is open on the outer peripheral surface of the taper part 41, a first oil groove 44 is formed along the circumferential direction of the taper part 41. The oil flowing out of the opening of the first radial oil passage 43 flows in the first oil groove 44, by which the oil is permeated in the circumferential direction of the outer peripheral surface of the taper part 41. Also, at a position at which the second radial oil passage 45 is open on the outer peripheral surface of the taper part 41, a second oil groove 46 is formed along the circumferential direction of the taper part 41. The oil flowing out of the opening of the second radial oil passage 45 flows in the second oil groove 46, by which the oil is permeated in the circumferential direction of the outer peripheral surface of the taper part 41. When the first oil groove 44 and the second oil groove 46 are filled with oil, the oil is permeated along the axial direction onto the coupling surfaces of the taper part 41 and the hub 30.

As shown in FIG. 4, in the tapered coupling structure 50 in which the tapered shaft 40 and the hub 30 are coupled to each other at a normal position, the first oil groove 44 is provided in a region (a first region) corresponding to the high-rigidity part 32 of the hub 30. Also, the second oil groove 46 is provided in a region (a second region) corresponding to the base part 31 of the hub 30.

In the tapered coupling structure 50, since the first oil groove 44 is provided in the region corresponding to the high-rigidity part 32 of the hub 30, the hydraulic pressure acting on the hub 30 against the surface pressure of the taper part 41 received from the high-rigidity part 32 is high.

Furthermore, in the tapered coupling structure 50, the second oil groove 46 is provided in the region corresponding to the base part 31 of the hub 30. Therefore, the oil can be permeated easily into a large region of the coupling surfaces in the axial direction of the tapered shaft 40 and the hub 30, so that the tapered shaft 40 can be coupled to or decoupled from the hub 30 more easily than in the first embodiment.

Third Embodiment

Figure 5A:
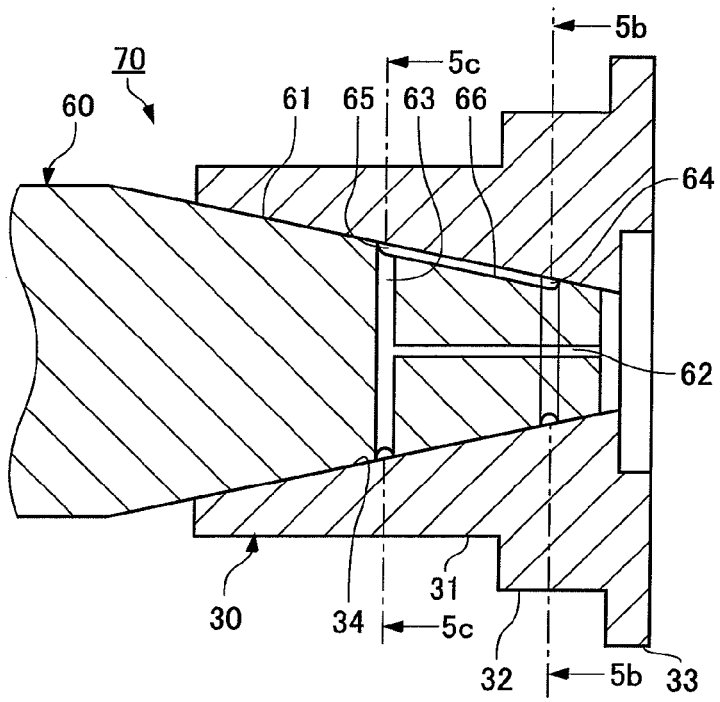
FIGS. 5A, 5B and 5C are sectional views of a tapered coupling structure in accordance with a third embodiment.
Figure 5B:
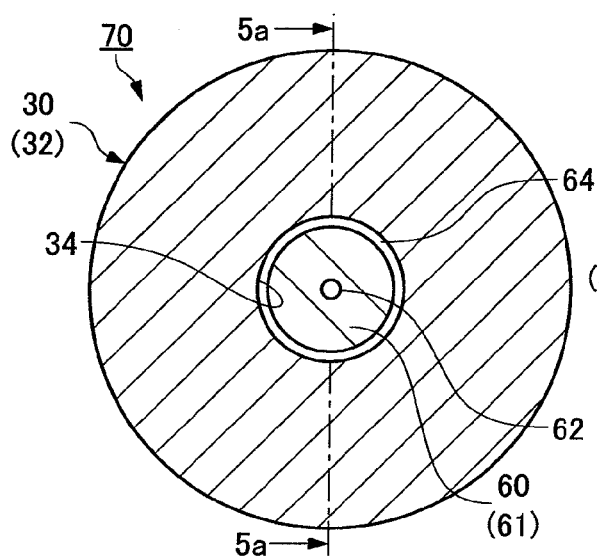
Figure 5C:
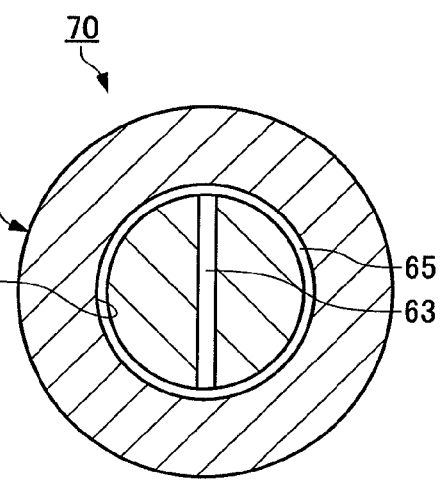

FIGS. 5A, 5B and 5C are sectional views of a coupling structure 70 in accordance with the third embodiment, FIG. 5A being a sectional view taken along the line 5a-5a of FIG. 5B, FIG. 5B being a sectional view taken along the line 5b-5b of FIG. 5A, and FIG. 5C being a sectional view taken along the line 5c-5c of FIG. 5A.

The coupling structure 70 comprises a tapered shaft 60 and the hub 30 coupled to the tapered shaft 60. The hub 30 is the same as that of the first embodiment, and therefore the explanation thereof is omitted.

The tapered shaft 60 comprises a taper part 61, and an axial oil passage 62 is formed along the axial direction of the tapered shaft 60 from the front end surface of the taper part 61. Also, in the radial direction of the taper part 61, a radial oil passage 63 is formed. The radial oil passage 63 communicates with the terminal end of the axial oil passage 62, and both ends thereof are open to the outer peripheral surface of the taper part 61. Therefore, oil fed from a hydraulic pressure source, not shown, flows in the axial oil passage 62 and the radial oil passage 63 in order, and flows out to the outer peripheral surface of the taper part 61.

At a position at which the radial oil passage 63 is open on the outer peripheral surface of the taper part 61, a second oil groove 65 is formed along the circumferential direction of the taper part 61. The oil flowing out of the opening of the radial oil passage 63 flows in the second oil groove 65, by which the oil is permeated in the circumferential direction of the outer peripheral surface of the taper part 61.

In the outer peripheral surface of the taper part 61, there is provided a connecting oil groove 66 one end of which communicates with the second oil groove 65 and which extends in the axial direction toward the front end of the tapered shaft 60. The other end of the connecting oil groove 66 communicates with a first oil groove 64. The first oil groove 64 is formed along the circumferential direction in the outer peripheral surface of the taper part 61. Some of the oil flowing in the second oil groove 65 passes through the connecting oil groove 66 and reaches the first oil groove 64. This oil flows in the first oil groove 64, by which the oil is permeated in the circumferential direction of the outer peripheral surface of the taper part 61.

In the tapered coupling structure 70 in which the tapered shaft 60 and the hub 30 are coupled to each other at a normal position, the first oil groove 64 is provided in a region corresponding to the high-rigidity part 32 of the hub 30. Also, the second oil groove 65 is provided in a region corresponding to the base part 31 of the hub 30.

In the tapered coupling structure 70, since the first oil groove 64 is provided in the region corresponding to the high-rigidity part 32 of the hub 30, the hydraulic pressure acting on the hub 30 against the surface pressure of the taper part 61 received from the high-rigidity part 32 is high.

Furthermore, in the tapered coupling structure 70, the second oil groove 65 is provided in the region corresponding to the base part 31 of the hub 30. Therefore, the oil can be permeated easily into a large region of the coupling surfaces in the axial direction of the tapered shaft 60 and the hub 30, so that the tapered shaft 60 can be decoupled from the hub 30 more easily than in the first embodiment.

Also, the feed of oil from the second oil groove 65 to the first oil groove 64 is accomplished via the connecting oil groove 66. This connecting oil groove 66 can be machined easily as compared with the first radial oil passage 43 in the second embodiment.

Fourth Embodiment

Regarding the coupling structure 50 shown as the second embodiment, a preferred procedure for decoupling the tapered shaft 40 from the hub 30 is explained with reference to FIGS. 6A, 6B and 6C.

The coupling structure 50 comprises the first oil groove 44 and the second oil groove 46. When the tapered shaft 40 is decoupled from the hub 30, oil can be fed from both of the first oil groove 44 and the second oil groove 46 from beginning to end of the decoupling, and also the feed of oil from the first oil groove 44 or the second oil groove 46 can be stopped depending on the stage of decoupling.

Figure 6A:
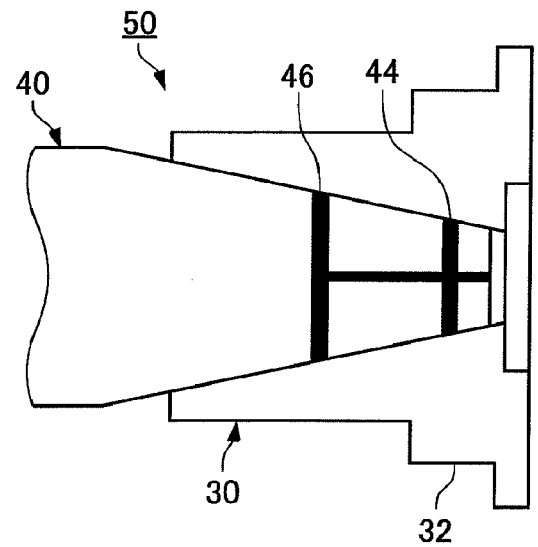
FIGS. 6A, 6B and 6C are sectional views showing a decoupling procedure for a tapered coupling structure in accordance with a second embodiment.

As shown in FIG. 6A, at the decoupling start time, since the surface pressure P received from the hub 30 by the tapered shaft 40 is the highest, oil is fed from both of the first oil groove 44 and the second oil groove 46. By doing this, the tapered shaft 40 and the hub 30 are moved relatively in the decoupling direction. In FIGS. 6A, 6B and 6C, the region to which oil is fed is painted over in black.

Figure 6B:
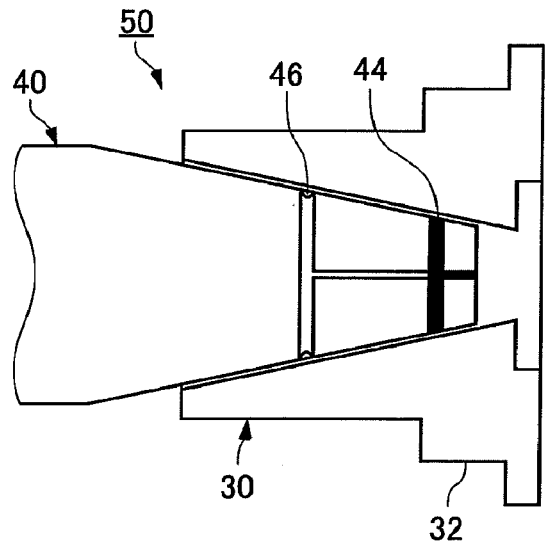

Next, as shown in FIG. 6B, the feed of oil from the second oil groove 46 is stopped, and oil is fed from the first oil groove 44 only. After oil has been fed from both of the first oil groove 44 and the second oil groove 46, decoupling can be performed relatively easily. However, to the region corresponding to the high-rigidity part 32, oil is fed from the first oil groove 44 because the surface pressure P thereof is high.

Figure 6C:
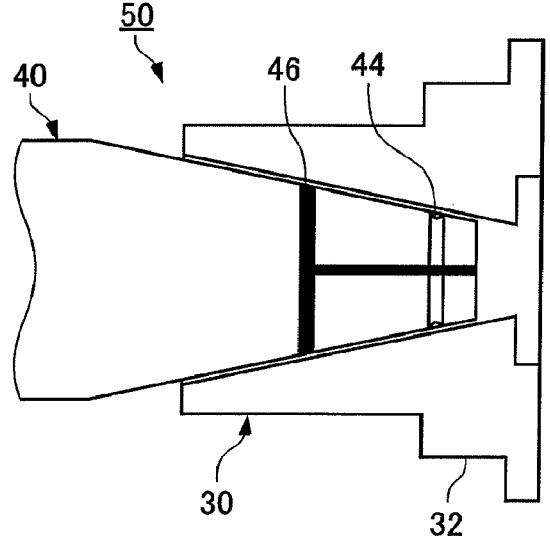

Next, as shown in FIG. 6C, the feed of oil from the first oil groove 44 is stopped, and the feed of oil from the second oil groove 46 is restarted. As the tapered shaft 40 and the hub 30 move relatively in the decoupling direction, the surface pressure P from the high-rigidity part 32 decreases. Therefore, to give priority to the permeation of oil in the axial direction as far as possible, oil is fed from the second oil groove 46.

The changeover timing from FIG. 6A to FIG. 6B and the changeover timing from FIG. 6B to FIG. 6C can be set appropriately based on the shapes, sizes, and the like of the tapered shaft 40 and the hub 30.

In the above description, a procedure consisting of the feed from both of the first oil groove 44 and the second oil groove 46, the feed from the first oil groove 44 only, and the feed from the second oil groove 46 has been used. However, a different procedure may be used depending on the shapes and sizes of the tapered shaft 40 and the hub 30 and further the use of the first oil groove 44 and the second oil groove 46. The essential thing is that in the case where two oil grooves of the first oil groove 44 and the second oil groove 46 are provided, a procedure suitable for decoupling the tapered shaft 40 from the hub 30 most efficiently should be used.

Means for feeding oil selectively from the first oil groove 44 and the second oil groove 46 is not subject to any restriction. For example, a nozzle member formed with discharge holes at positions corresponding to the first oil groove 44 and the second oil groove 46 is inserted into the axial oil passage 42, and is advanced and retracted.

The above is a description of embodiments of the present invention. Besides the above-described embodiments, the configurations described in the above-described embodiments can be taken and left, or can be changed appropriately to another configuration as far as not departing from the spirit and scope of the present invention.

For example, the oil groove can be provided in the hub as described in Japanese Registered Utility Model No. 3054261, or the oil passage can be provided in the hub. Also, in the above description, explanation of decoupling has been given. However, needless to say, the present invention is effective for coupling operation.

Figure 7:
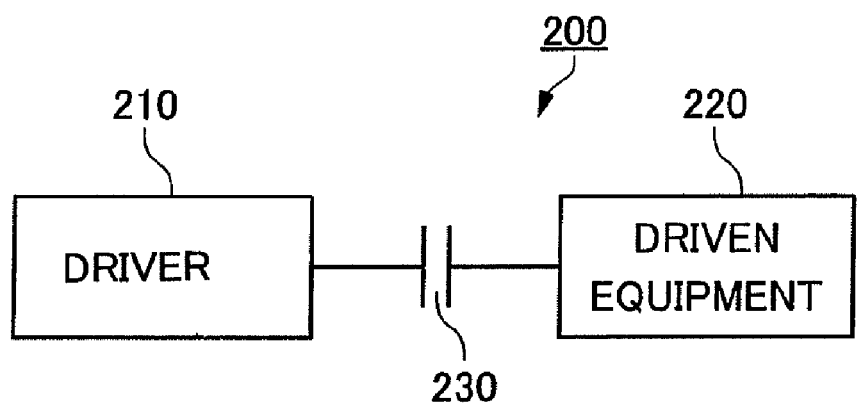
FIG. 7 is a diagram showing a general configuration of a rotating machine for which a tapered coupling structure is used.

In a rotating machine 200 including a driver 210 for delivering a rotational force and a driven equipment 220 rotationally driven by the output of the driver 210 as shown in FIG. 7, the tapered coupling structure 10 (50, 70) described above is used as a coupling structure 230 for transmitting the output of the driver 210 to the driven equipment 220. In this case, the tapered coupling structure is formed by providing a taper-shaped shaft end on either one of the rotating shaft on the driver 210 side and the rotating shaft on the driven equipment 220 side and by providing a hub on the other thereof. As the driver 210, for example, a steam turbine, a gas turbine, an internal combustion engine, or an electric motor is used. As the driven equipment 220, a compressor, a wheel, a propeller, or the like is used. Between the driver 210 and the driven equipment 220, a speed-up gear and/or a variable speed gear can be provided. In this case, the shaft end of the rotating shaft of the speed-up gear and/or the variable speed gear may be made taper-shaped, or a hub may be provided thereon.

What is claimed is:

1. A tapered coupling structure comprising:
    a tapered shaft having a taper part with a front end surface; and
    a hub to be coupled to the tapered shaft, wherein
    the taper part is on a side of the tapered shaft which is coupled to the hub,
    the hub includes a base part and a part having a thickness in a radial direction that is greater than that of the base part and having a rigidity in the radial direction that is greater than that of the base part,
    an outer peripheral surface of the taper part or an inner peripheral surface of the hub has formed therein a first oil groove, a second oil groove, and a connecting oil groove that communicates with the first and second oil grooves to feed oil to coupling surfaces of the taper part of the tapered shaft and the part and base part of the hub,
    the first oil groove is provided in a first region corresponding to the part of the hub in an axial direction,
    the tapered shaft has an axial oil passage located therein that extends in an axial direction of the tapered shaft from the front end surface of the taper part, and a radial oil passage extending in a radial direction of the tapered shaft and communicating with the axial oil passage,
    the radial oil passage has opposite ends that both open to the outer peripheral surface of the taper part, and
    the second oil groove is provided in a second region that is different from the first region and that is at a position at which the opposite ends of the radial oil passage open to the outer peripheral surface of the taper part.

2. The tapered coupling structure according to claim 1, wherein the part of the hub is arranged adjacent to a front end side of a coupling part of the taper part of the tapered shaft.

3. The tapered coupling structure according to claim 2, wherein
    the part of the hub has a width in the axial direction, and
    the first oil groove is positioned at a rear end side of a center of the width of the part in the axial direction away from the front end surface of the taper part.

4. A rotating machine comprising:
    a driving device for delivering a rotational force;
    a driven device rotationally driven by the driving device; and
    a coupling structure for transmitting the rotational force of the driving device to the driven device, wherein
    the coupling structure comprises the tapered coupling structure according to claim 1.

* * * * *